Nov. 12, 1940.    A. O. A. HODGE    2,221,189
ROTARY PUMP
Filed Jan. 3, 1938    2 Sheets-Sheet 1

Inventor
Arthur O. A. Hodge
By Lyon & Lyon
Attorneys

Nov. 12, 1940.   A. O. A. HODGE   2,221,189
ROTARY PUMP
Filed Jan. 3, 1938   2 Sheets-Sheet 2
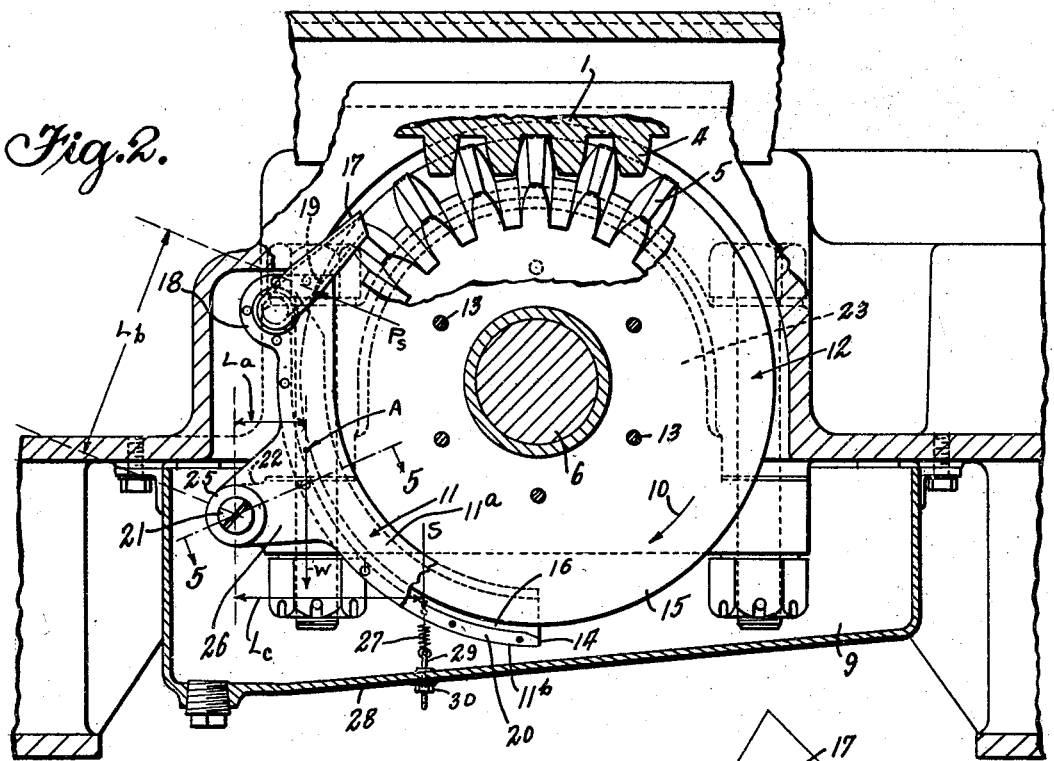
Fig. 2.
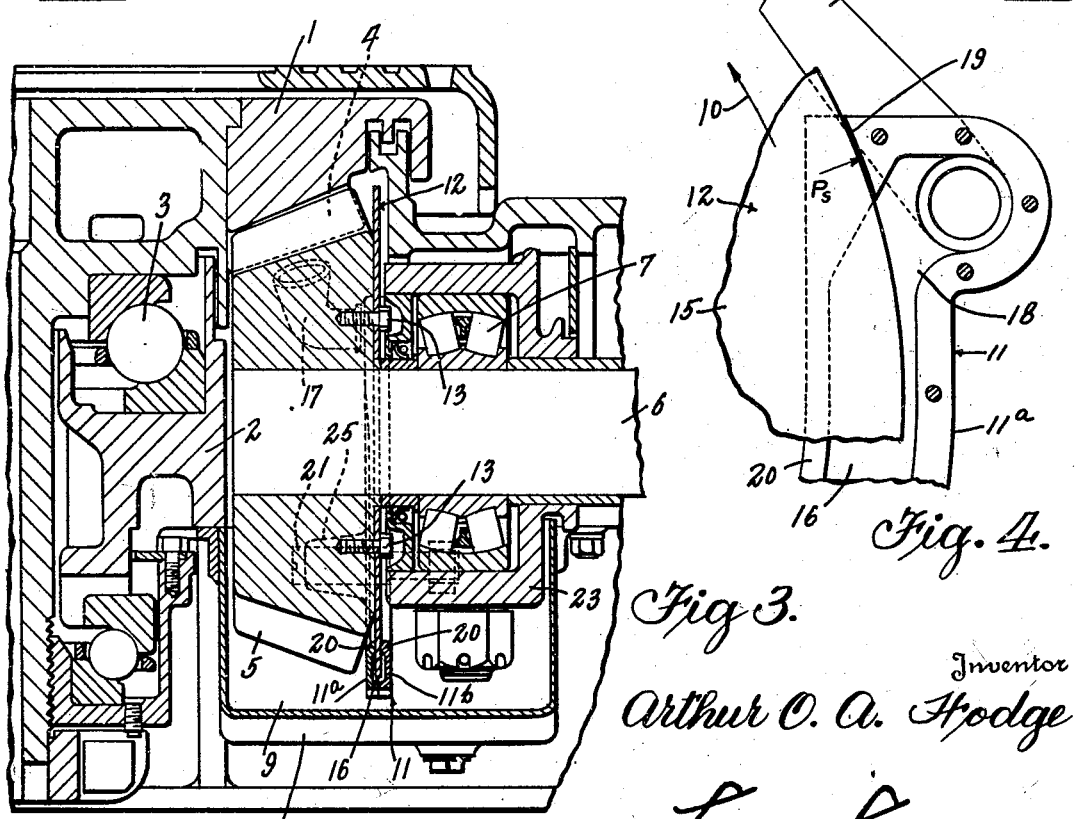
Fig. 3.
Fig. 4.
Inventor
Arthur O. A. Hodge
By Lyon & Lyon
Attorneys Patented Nov. 12, 1940

2,221,189

UNITED STATES PATENT OFFICE 2,221,189

ROTARY PUMP

Arthur O. A. Hodge, Hermosa Beach, Calif., assignor to The National Supply Company, Pittsburgh, Pa., a corporation of Pennsylvania Application January 3, 1938, Serial No. 182,866

12 Claims. (Cl. 103—84)

This invention relates to rotary pumps, and more particularly to a pump of the rotary type applicable for the pumping of lubricating oil.

The pump as shown is illustrated as adapted to the lubrication of the enclosed operating parts of a rotary machine as used in the rotary process of drilling wells for the recovery of oil, water, gas, or the like, but its use is not limited to such application. The rotary machine as shown is shown merely for the purpose of illustration to illustrate the adaptability of such a pump to such an operating mechanism, and applicant makes no claim of invention with respect to such rotary machine which rotary machine is the development of another.

In any operation of enclosed gearing, particularly of the types wherein heavy loads are encountered, and where it is desired to operate such gearing at relatively high speeds, the efficiency of such operation is to a considerable degree determined by the adequacy of the lubrication method provided.

In the operation of a rotary machine such as that illustrated wherein the rotary table is utilized for the purpose of rotating long lengths of drill stem for the purpose of operating a bit which may be suspended in the drill hole several thousand feet below the table, the provision of means to insure adequate lubrication is essential if such rotary machine is to operate efficiently or for long periods of time.

It is therefore an object of my invention to provide a rotary pump particularly adaptable for, but not limited in its use to, the lubrication of the operating gear mechanism of such a rotary machine.

Another object of my invention is to provide a simple and inexpensive form of lubricant pump of the rotary viscosity type which is particularly applicable for use in connection with the lubrication of enclosed gearing.

Another object of my invention is to provide a lubricant pump of the rotary viscosity type which includes a minimum number of parts and which is of simple and inexpensive construction and substantially self-aligning in operation.

Another object of my invention is to provide a rotary viscosity type pump applicable for use in connection with enclosed gearing or the like, including means whereby the output of such pump may be adjusted in accordance with the lubrication requirements of such gearing.

Other objects and advantages of my invention it is believed will be apparent from the following detailed description of a preferred embodiment thereof as illustrated in the accompanying drawings.

In the drawings:

Figure 2 is a sectional end view taken substantially on the line 2—2 of Figure 1.

Figure 3 is a sectional elevation taken substantially on the line 3—3 of Figure 1.

Figure 4 is an enlarged fragmental detail view of the pick-up means of the rotary viscosity pump embodied in my invention.

Figure 1:
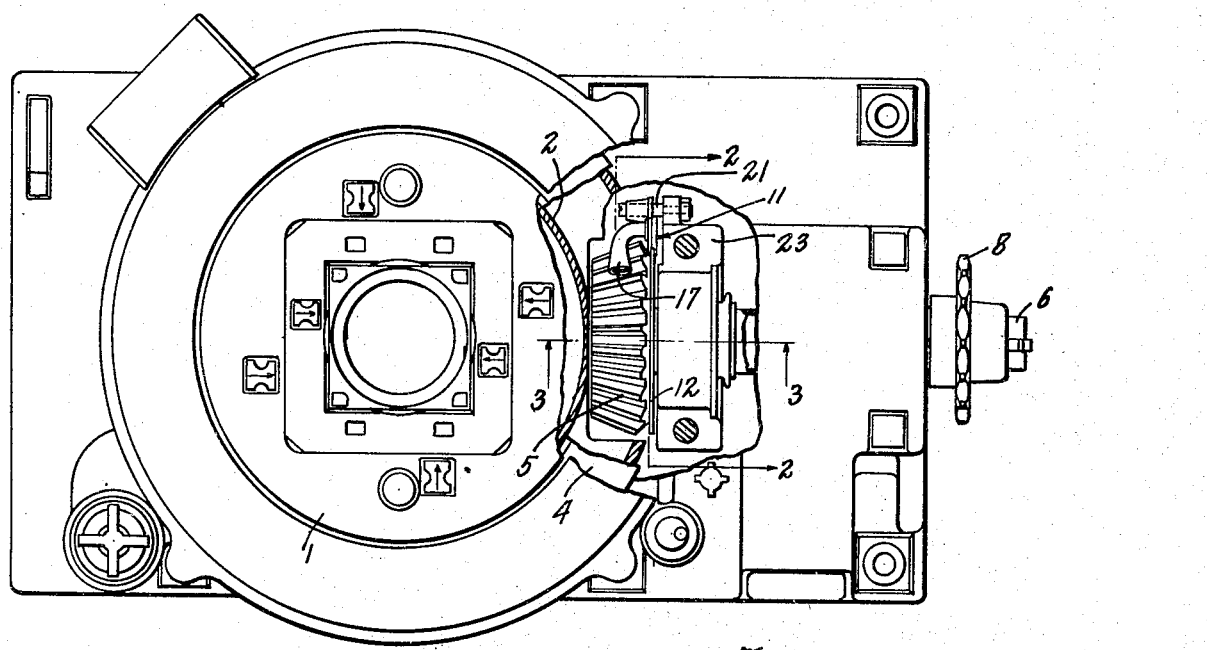
Figure 1 is a plan view partly in horizontal section of the rotary machine embodying my invention illustrating the rotary machine as broken away to show the rotary viscosity pump of my invention.
Figure 5:
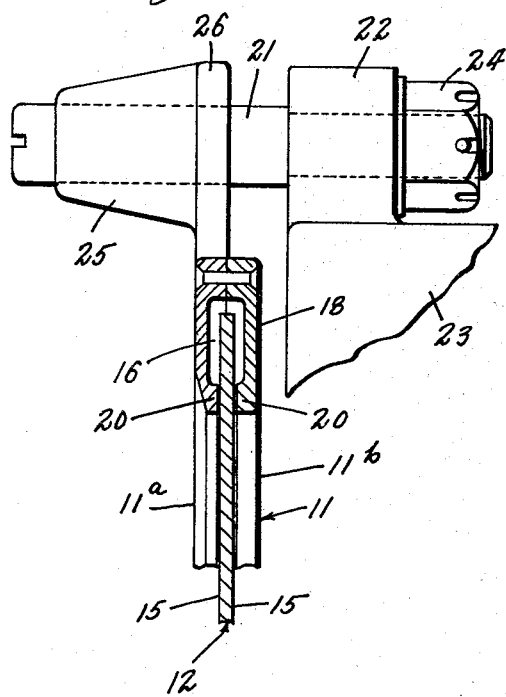
Figure 5 is a fragmental sectional detail taken substantially on the line 5—5 of Figure 2.
Figure 6:
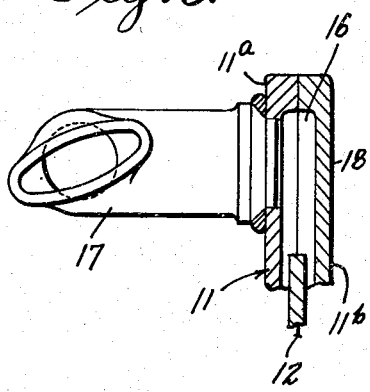
Figure 6 is a further detailed view illustrating the discharge section of the rotary viscosity pump embodying my invention.

In the drawings for the purpose of illustration I have indicated a rotary machine including a table 1, which is rotatably supported upon a base 2 on supporting bearings 3. The table 1 carries a gear ring 4 in position to mesh with a pinion 5. The pinion 5 is secured to a pinion shaft 6. The pinion shaft 6 is rotatably supported upon bearings 7. At its extending end the pinion shaft 6 is provided with a sprocket 8 by which the pinion shaft is driven from any suitable source as is well understood in the art.

The rotary viscosity pump embodying my invention is, in the illustration given, shown as positioned and mounted so as to maintain the flow of lubricant from a sump or chamber 9 below the pinion 5 to the ring gear 4 immediately in advance of its position of mesh with the pinion 5 so as to insure that adequate lubrication is at all times maintained between the teeth of the ring gear 4 and the pinion 5 throughout the extent of the teeth.

The pinion shaft 6 is, under ordinary operation, rotated in the direction of the arrow 10 (Figure 2). The rotary viscosity pump includes essentially two elements which are a stationary channel-shaped member 11 and a rotating disc 12. The disc 12 is secured in any suitable manner to a rotating element, and as illustrated, is secured by the cap screws 13 to the rear face of the pinion 5. The channel-shaped member 11 is, as illustrated, formed of two complementary halves 11ª and 11ᵇ for convenience in casting, and the two halves are secured together by means of rivets or other suitable fastening means. The lower end 14 of the channel member 11 is open within the sump or chamber 9 below the level of lubricant therein. As the disc 12 rotates in the direction of the arrow 10, lubricant within the chamber 9 adheres to its surfaces 15 and to its periphery, and is thus carried into the channel 16 of the channel-shaped member 11. The upper end of the channel-shaped member is connected to a discharge conduit or spout 17 which is positioned and directed so as to deliver the lubricant to the point of the gearing requiring lubrication. In this case the spout 17 is formed so as to deliver and distribute lubricant over the entire extent of the teeth of the gear 4 and pinion 5.

In order to transfer the lubricant from the channel 16 to the spout 17, the discharge end 18 of the channel member 11 is provided with a shoe 19 which rides upon the outer periphery of the disc 12, and operates together with the side ribs 20 to provide a restriction in the channel 16 which collects and directs the lubricant adhering to the disc 12 outwardly and through the discharge nozzle or spout 17.

In order to form this viscosity rotary pump in a simple and inexpensive manner, the stationary element or channel member 11 is provided with a single support about which it is free to adjust itself so that the shoe 19 under operation may adjust itself to the periphery of the disc 12 as required under the different conditions of operation. Member 11 is also free to adjust itself lengthwise of its pivotal support in operation. Thus the member 11 is provided with a floating support which permits the member to automatically assume the correct operating position to assure adequate clearances in its operation.

The pivotal support provided includes a supporting pin 21 which passes through an ear 22 formed upon the bearing box 23. The pin 21 is held in position by means of the nut 24. The pin 21 projects laterally from the ear 22 parallel to the axis of the pinion shaft 6 and through the boss 25 formed at the end of the arm 26 of the channel-shaped member 11. The pin 21 forms a loose fit in the boss 25 so that the member 11 may have both pivotal and longitudinal movement with respect to the pin 21.

A very important result is obtained through the floating mounting of the member 11 in that it allows the member 11 to pivot about the pin 21 and to thereby relieve the shoe 19 from direct contact with the disc 12 and permits the shoe 19 to adjust itself with respect to the disc 12 in accordance with the hereinafter set forth factors to determine the rate of discharge of the oil through the nozzle or spout 17. Thus, for example, there is at all times resulting from the weight of the member 11 as viewed in Figure 2, a force tending to rotate the member 11 in a clockwise direction around the pin 21. This force tends to hold the curved inner periphery of the shoe 19 against the curved periphery of the disc 12. This force acts through a certain distance which, if we assume the center of gravity of the member 11 to be at the point A and the weight acting at this point W, would produce the resultant couple of $WL_a$ where $L_a$ represents the horizontal distance from the center of the pin 21 to the point A. This force tending to turn the member 11 in a clockwise direction is resisted by a force against the shoe 19 and ribs 20 due to the flow of lubricant and the picking up of the lubricant by and against the shoe 19 and ribs 20. This force may be represented by $P_s$, and this force acts through a distance represented by the distance of the effective centers of this pressure operating upon the shoe 19 and ribs 20 to the center of the pin 21, which distance may be indicated as $L_b$.

When the back pressure from the nozzle 17 exceeds a predetermined maximum corresponding to the maximum desired discharge, the force $P_s$ reaches a value sufficiently high to move the shoe outwardly from the periphery of the disc 12. Such movement reduces the amount of oil collected from the disc 12 and consequently reduces the amount of the discharge. The discharge pressure is thus automatically regulated.

In order to adjust the discharge pressure of the lubricant from the nozzle 17, means may be provided to enhance the couple $W x L_a$ such, for example, as by interposing a spring 27 between the member 11 and case 28. In order to provide for the adjustment of this couple so that the discharge pressure may be varied at will, the spring 27 may be connected to an eye bolt 29 which is provided with a nut 30 so that the pull exerted by the spring 27 may be adjusted as desired. This spring operates with an additional force in a clockwise direction opposing the fluid pressure against the shoe 19 and ribs 20, and operates through a distance represented by the horizontal distance from the center of the pin 21 to the point of connection of the spring 27 with the member 11, which distance may be represented as $L_c$. The force of the spring 27 may at any time or under any adjustment be indicated as S. For any operating condition the relations of the forces acting upon the pump member 11 may be represented by $$W x L_a + S x L_c = P_s x L_b$$

Having fully described my invention, it is to be understood that I do not wish to be limited to the details herein set forth, but my invention is of the full scope of the appended claims.

I claim:

1. In a rotary pump, the combination of a rotatable disk, a relatively stationary member pivotally mounted about an axis substantially parallel to and non-coincident with the axis of rotation of the disk, a recess on said member co-operating with the outer periphery of the disk to form a pumping chamber, inlet and outlet passage means communicating with said chamber, a restriction at one end of the recess including a shoe on said member adapted to contact the disk to limit the pivotal movement of the member, such movement of the member about its axis serving to vary the effectiveness of the restriction and thereby vary the effective out-put of the pump.

2. In a rotary pump, the combination of a rotatable disk, a relatively stationary member co-operating with the disk and pivotally mounted about an axis spaced from and substantially parallel to the axis of rotation of the disk, a recess on said member co-operating with the outer periphery and portions of the lateral faces of the disk to form a pumping chamber, inlet and outlet passage means communicating with said chamber, a restriction at one end of the recess including a shoe on said member adapted to contact the disk to limit the pivotal movement of the member, such movement of the member about its axis serving to vary the effectiveness of the restriction and thereby vary the effective out-put of the pump.

3. In a rotary pump, the combination of a rotatable member, a relatively stationary member adapted to cooperate with the outer periphery of the rotatable member, a recess in one of said members forming a pumping chamber between said members, said stationary member being pivotally mounted about an axis substantially parallel to and non-coincident with the axis of the rotatable member, inlet and outlet passage means communicating with said chamber, a restriction at one end of said chamber including a shoe on the stationary member adapted to contact the rotatable member to limit the pivotal movement of the stationary member, such movement of the stationary member about its axis serving to vary the effectiveness of the restriction and thereby vary the effective out-put of the pump.

4. In a rotary pump, the combination of a rotatable disk member, a relatively stationary quadrant member adapted to cooperate with the periphery of said disk member, a recess in one of said members forming a pumping chamber between said members, inlet and outlet passage means communicating with said chamber, said quadrant member being pivotally supported about an axis spaced from but substantially parallel to the axis of rotation of the disk member, a shoe on said quadrant member adapted to contact the disk member to limit pivotal movement of the quadrant member, the center of gravity of the quadrant member being so disposed with reference to its axis of support that the weight of the quadrant member acts to urge said shoe toward its disk-contacting position.

5. In a rotary pump, the combination of a rotatable disk member, a relatively stationary quadrant member adapted to cooperate with the periphery of said disk member, a recess in one of said members forming a pumping chamber between said members, inlet and outlet passage means communicating with said chamber, said quadrant member being pivotally supported about an axis spaced from but substantially parallel to the axis of rotation of the disk member, the center of gravity of the quadrant member being so disposed with reference to its axis of support that the weight of the quadrant member urges the quadrant member to rotate in the same direction as the direction of rotation of the disk.

6. In a rotary pump, the combination of a rotatable disk, a channel shaped member cooperating with but in action relatively stationary with respect to said disk, said channel shaped member embracing but spaced from the periphery and portions of the lateral faces of the disk, said peripheral and lateral portions of said disk constituting pumping surfaces and said member cooperating with said disk to provide an arcuate pumping chamber, inlet and outlet passage means communicating with said chamber, means to pivotally support said member in operative relation with the disk, a shoe on said member adapted to contact the disk to limit pivotal movement of the member, and resilient means normally acting to maintain said shoe and disk in operative relation.

7. In a rotary pump, the combination of a rotatable disk, a channel shaped member cooperating with but in action relatively stationary with respect to said disk, said channel shaped member embracing but spaced from the periphery and portions of the lateral faces of the disk, said peripheral and lateral portions of said disk constituting pumping surfaces and said member cooperating with said disk to provide an arcuate pumping chamber, inlet and outlet passage means communicating with said chamber, means to pivotally support said member in operative relation with the disk, said member being formed to cooperate with the disk to define a restriction for said pump chamber adjacent the outlet passage means, and resilient means normally acting to maintain said member and disk in operative relation.

8. In a rotary pump, the combination of a rotatable disk, a channel shaped member cooperating with but in action relatively stationary with respect to said disk, said channel shaped member embracing but spaced from the periphery and portions of the lateral faces of the disk, said peripheral and lateral portions of said disk constituting pumping surfaces and said member cooperating with said disk to provide an arcuate pumping chamber, inlet and outlet passage means communicating with said chamber, means to pivotally support said member in operative relation with the disk, said means including a stationary pin positioned at one side of said shaft upon which said member is freely mounted, said member being formed to cooperate with the disk to define a restriction for said pump chamber adjacent the outlet passage means, and adjustable resilient means normally acting to maintain said member and disk in operative relation.

9. In a rotary pump, the combination of a base, a shaft rotatably mounted on the base, a disk secured to said shaft and adapted to rotate therewith, means forming a fluid reservoir in said base, a portion of the disk extending into said fluid reservoir, a relatively stationary member having a recess adapted to cooperate with the outer periphery and portions of the lateral faces of the disk to form a pumping chamber, said member being mounted on the base and adapted for limited movement parallel to the axis of the shaft, whereby the recess may be self-aligning with respect to said disk, inlet means from said reservoir to one end of said member, the other end of said member being formed to cooperate with the disk to define a restriction for said pumping chamber, and outlet passage means communicating with said chamber at a point adjacent the restriction.

10. In a rotary pump, the combination of a rotatable cylindrical member, a relatively stationary member adapted to cooperate with the outer periphery of the rotatable member, a recess in one of said members forming a pumping chamber between said members, means to pivotally support the stationary member, said means including a stationary pin laterally spaced from the rotary axis of said cylindrical member and upon which the stationary member is freely slidable, whereby the stationary member may be self-aligning with respect to the rotatable member, inlet passage means communicating with one end of said chamber, and fluid collecting means on said stationary member at the other end of said chamber.

11. In a rotary pump, the combination of a rotatable disk member, a relatively stationary member adapted to cooperate with the periphery of said disk member, a recess in one of said members forming a pumping chamber between said members, inlet and outlet passage means communicationg with said chamber, means to support said stationary member for pivotal movement about an axis spaced from and substantially parallel to the axis of rotation of the disk member, said stationary member being also adapted for limited lateral movement along its supporting axis.

12. In a rotary pump, the combination of a rotatable disk member, a relatively stationary member adapted to cooperate with the periphery of said disk member, a recess in one of said members forming a pumping chamber between said members, inlet and outlet passage means communicating with said chamber, means to support said stationary member for pivotal movement about an axis spaced from the axis of rotation of the disk member, the center of gravity of the stationary member being disposed between the said axes, whereby the rotatable disk member partially supports the stationary member.

ARTHUR O. A. HODGE.